United States Patent
Kemmochi

(10) Patent No.: US 12,314,561 B2
(45) Date of Patent: May 27, 2025

(54) INFORMATION INPUT APPARATUS, METHOD FOR CONTROLLING INFORMATION INPUT APPARATUS, AND NON-TRANSITORY RECORDING MEDIUM

(71) Applicant: Eiji Kemmochi, Tokyo (JP)

(72) Inventor: Eiji Kemmochi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/602,070

(22) Filed: Mar. 12, 2024

(65) Prior Publication Data
US 2024/0310997 A1  Sep. 19, 2024

(30) Foreign Application Priority Data

Mar. 15, 2023  (JP) ................................. 2023-040877

(51) Int. Cl.
  *G06F 3/04883* (2022.01)
  *G06F 3/038* (2013.01)
  *G06F 3/04842* (2022.01)

(52) U.S. Cl.
  CPC .......... *G06F 3/04883* (2013.01); *G06F 3/038* (2013.01); *G06F 3/04842* (2013.01)

(58) Field of Classification Search
  CPC .. G06F 3/04883; G06F 3/038; G06F 3/04842; G06F 3/04845; G06F 40/171; G06V 30/1423
  See application file for complete search history.

(56) References Cited

U.S. PATENT DOCUMENTS

| | | |
|---|---|---|
| 6,826,724 B1 | 11/2004 | Shimada et al. |
| 7,194,471 B1 | 3/2007 | Nagatsuka et al. |
| 2007/0050325 A1 | 3/2007 | Nakatomi et al. |
| 2007/0051793 A1 | 3/2007 | Katoh et al. |
| 2007/0136288 A1 | 6/2007 | Shimada et al. |
| 2008/0072225 A1 | 3/2008 | Nagatsuka et al. |
| 2012/0050197 A1 | 3/2012 | Kemmochi |
| 2013/0147736 A1 | 6/2013 | Sakuramata et al. |
| 2013/0188877 A1* | 7/2013 | Gulwani ............. G06F 3/04883 382/203 |
| 2013/0283198 A1 | 10/2013 | Kemmochi et al. |
| 2014/0247463 A1 | 9/2014 | Kemmochi et al. |
| 2016/0308979 A1 | 10/2016 | Kemmochi et al. |
| 2016/0315935 A1 | 10/2016 | Tsukuda et al. |

(Continued)

FOREIGN PATENT DOCUMENTS

| | | |
|---|---|---|
| JP | H06-076033 A | 3/1994 |
| JP | 2002-278700 A | 9/2002 |
| JP | 2004-123396 A | 4/2004 |

OTHER PUBLICATIONS

U.S. Appl. No. 10/976,991, filed Nov. 1, 2004.

*Primary Examiner* — Premal R Patel
(74) *Attorney, Agent, or Firm* — XSENSUS LLP

(57) ABSTRACT

An information input apparatus comprising circuitry to receive input of a handwritten line from an operator, in response to completion of the input of the handwritten line, present one or more straight line candidates inferred based on the handwritten line, provide a user interface (UI) that allows the operator to select one of the one or more straight line candidates, and replace the handwritten line with one of the one or more straight line candidates selected by the operator.

3 Claims, 7 Drawing Sheets

(56) References Cited

U.S. PATENT DOCUMENTS

| | | |
|---|---|---|
| 2017/0293826 A1 | 10/2017 | Kemmochi et al. |
| 2017/0310830 A1 | 10/2017 | Kemmochi et al. |
| 2018/0082663 A1 | 3/2018 | Kemmochi et al. |
| 2018/0234579 A1 | 8/2018 | Watanabe et al. |
| 2023/0070034 A1* | 3/2023 | Yoshida .............. G06F 3/04883 |

* cited by examiner

INFORMATION INPUT APPARATUS, METHOD FOR CONTROLLING INFORMATION INPUT APPARATUS, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-040877, filed on Mar. 15, 2023, in the Japan Patent Office, the entire disclosure of which is hereby incorporated by reference herein.

BACKGROUND

Technical Field

Embodiments of the present disclosure relate to an information input apparatus, a method for controlling an information input apparatus, and a non-transitory recording medium.

Related Art

An interactive whiteboard allows an operator to freely input handwriting or text on a touch panel display using, for example, a finger or a pen, and electronically stores the result of the handwriting or the text input by the operator. A typical interactive whiteboard have a function to input a stroke traced on the screen with the finger or the pen as it is, as well as another function to input a straight line connecting the start and end points of the input.

For example, in order to enable drawing of a fine line while maintaining the accuracy in detecting handwritten input, the known interactive whiteboard includes a handwriting mode start unit, a storage unit, a handwriting mode end unit, and a display control unit. The handwriting mode start unit starts a handwriting input mode. In the case where the handwriting input mode is started, the storage unit temporarily stores a handwritten line drawn on an input face of the interactive whiteboard while the handwriting input mode is on. The handwriting mode end unit ends the handwriting input mode. In the case where the handwriting input mode is ended, the display control unit displays the handwritten line stored by the storage unit at a predetermined position on a display face of the interactive whiteboard at a predetermined scale.

SUMMARY

In one aspect, an information input apparatus comprising circuitry to receive input of a handwritten line from an operator, in response to completion of the input of the handwritten line, present one or more straight line candidates inferred based on the handwritten line, provide a user interface (UI) that allows the operator to select one of the one or more straight line candidates, and replace the handwritten line with one of the one or more straight line candidates selected by the operator.

In another aspect, a method for controlling an information input apparatus includes receiving input of a handwritten line from an operator, in response to completion of the input of the handwritten line, presenting one or more straight line candidates inferred based on the handwritten line, providing a user interface (UI) that allows the operator to select one of the one or more straight line candidates, and replacing the handwritten line with one of the one or more straight line candidates selected by the operator.

In another aspect, a non-transitory recording medium storing a plurality of program codes which, when executed by one or more processors, causes the one or more processors to perform a method including receiving input of a handwritten line from an operator, in response to completion of the input of the handwritten line, presenting one or more straight line candidates inferred based on the handwritten line, providing a user interface (UI) that allows the operator to select one of the one or more straight line candidates, and replacing the handwritten line with one of the one or more straight line candidates selected by the operator.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
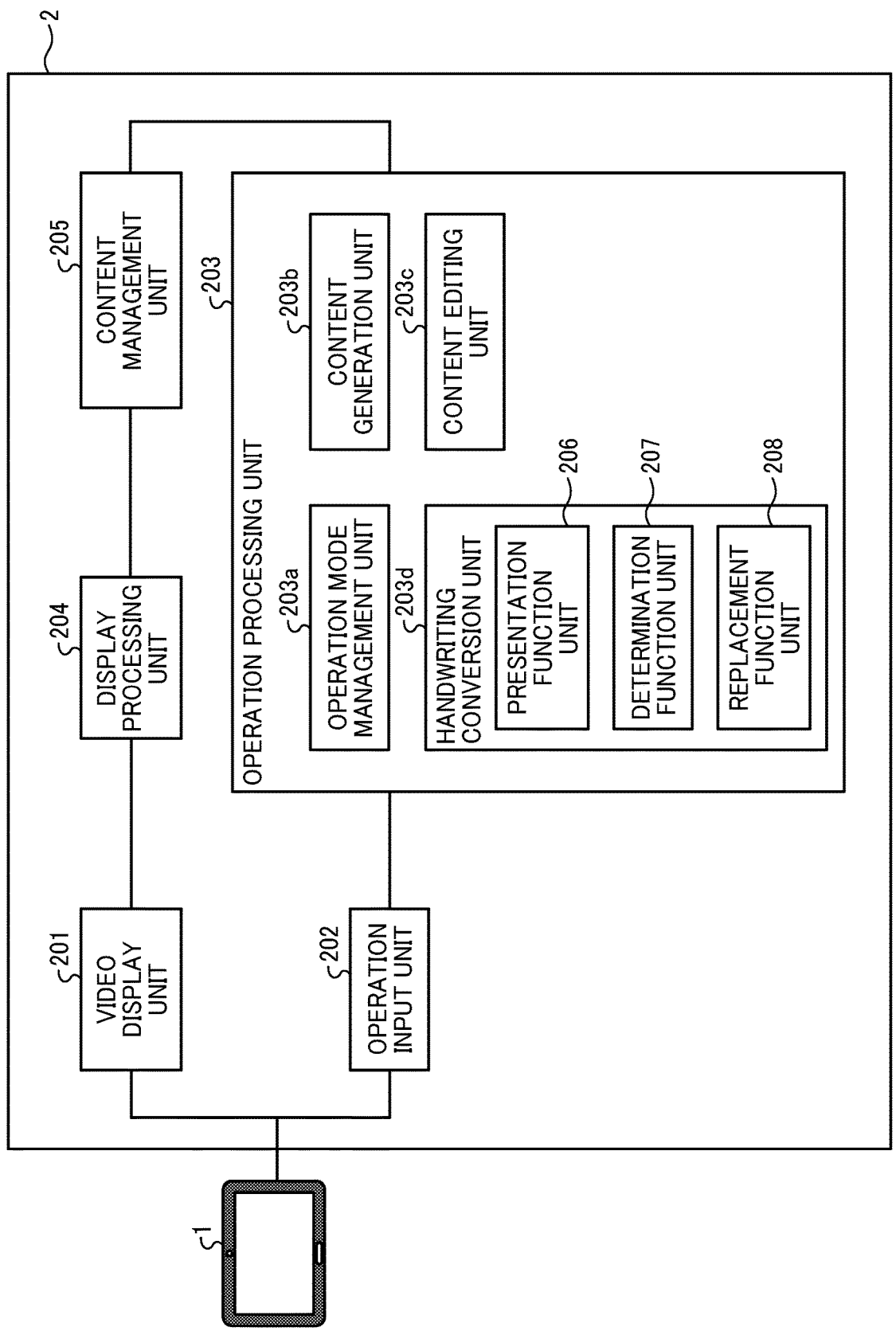
FIG. 1 is a block diagram illustrating a configuration of an interactive whiteboard to which an information input apparatus is applied, according to the first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information input apparatus, a method for controlling an information input apparatus, and a non-transitory recording medium according to embodiments of the present disclosure are described in detail below with reference to the drawings.

First Embodiment

FIG. 1 is a block diagram illustrating a configuration of an interactive whiteboard to which an information input apparatus is applied, according to the first embodiment of the present disclosure. The interactive whiteboard according to the present embodiment serves as an information input apparatus capable of inputting a handwritten line and a straight line. In the present embodiment, as illustrated in FIG. 1, the interactive whiteboard includes a touch panel display 1 and a controller 2.

The controller 2 has a hardware configuration similar to that of a general purpose personal computer (PC). Specifically, the controller 2 includes, for example, a central processing unit (CPU), a memory, a graphics processing unit (GPU), an input and output (I/O) controller for a universal serial bus (USB), and a network adapter.

The touch panel display 1 and the controller 2 do not necessarily have to be dedicated devices. For example, a MICROSOFT SURFACE HUB 2S or a RICOH INTERACTIVE WHITEBOARD may be used as an integrated device of the touch panel display 1 and the controller 2. In the present embodiment, the MICROSOFT WINDOWS operating system (OS) may be used as the OS of the controller 2, and the whiteboard function may be implemented by a WINDOWS application using the ".NET Framework."

The controller 2 executes programs stored in a storage medium such as a memory, using another memory as a work area, to implement a video display unit 201, an operation input unit 202, an operation processing unit 203, a display processing unit 204, and a content management unit 205.

The video display unit 201 displays, on the touch panel display 1, an operation panel of the interactive whiteboard and contents such as a handwriting and a straight line. In the present embodiment, the video display unit 201 is implemented by the function of the OS.

The operation input unit 202 acquires the coordinates of a position where a touch is input on the touch panel display 1 and the state of the touch, and outputs an operation event. In the present embodiment, the operation input unit 202 serves as a user interface (UI) used for an operation performed by an operator to select a straight line candidate that replaces a handwritten line input by the operator. In the present embodiment, the operation input unit 202 is implemented by the function of the OS.

As illustrated in FIG. 1, the operation processing unit 203 includes an operation mode management unit 203a, a content generation unit 203b, a content editing unit 203c, and a handwriting conversion unit 203d.

The operation mode management unit 203a monitors and acquires an operation event. The operation mode management unit 203a changes the operation modes assigned to the buttons on the operation panel based on the acquired operation event. The examples of the operation mode are a handwriting input mode, a straight line input mode, a deletion mode, a magnification mode, a movement mode, and a copy mode.

The content generation unit 203b generates a content in accordance with the operation mode and arranges the content at the coordinates of the position according to the operation event. The content editing unit 203c edits the content that is an operation target in accordance with the operation mode and arranges the edited content at the coordinates of the position according to the operation event.

When the operation mode is set to the handwriting mode, the handwriting conversion unit 203d determines whether to present (display) straight line candidates to replace a handwritten line in response to a touch end indicating the completion of the handwritten line input by the operator. Further, when the condition for determining whether to present straight line candidates is satisfied, the handwriting conversion unit 203d presents the straight line candidates. Then, in accordance with a straight line candidate selected by the operator, the handwriting conversion unit 203d changes (replaces) the handwritten line to (with) the straight line candidate and arranges (displays) the straight line candidate.

Specifically, the handwriting conversion unit 203d includes a presentation function unit 206, a determination function unit 207, and a replacement function unit 208. The presentation function unit 206 serves as a presentation device that infers straight line candidates based on the handwritten line and presents the inferred straight line candidates when the input of the handwritten line is completed. In this case, the determination function unit 207 may serve as a determination device that determines whether to present the straight line candidates after the input of the handwritten line. At this point, the determination of whether to present the straight line candidates may be performed at the time of a double tap after the input of the handwritten line. In this way, by detecting the double tap at a position in the vicinity of the touch-end position within the specified period of time after the touch end indicating the completion of the input of the handwritten line, the determination function unit 207 can determine that the operator has instructed conversion to a straight line, and displays the straight line candidates.

When the straight line candidates are determined to be presented, the presentation function unit 206 is to present the straight line candidates. The replacement function unit 208 serves as a replacement device that replaces a handwritten line with a straight line candidate to be selected by the operator. In the related art, in switching the input of a handwritten line or a straight line on a whiteboard, typically the mode is switched by operating, for example, a menu button. Accordingly, to switch the mode, the operation of inputting the handwritten line needs to be interrupted. However, according to the present embodiment, since the operator can select whether to convert the handwritten line into the straight line candidate, the handwritten line can be converted into the straight line candidate as needed. In addition, since the input of the handwritten line can be continued without being disturbed by unnecessary suggestions, the handwritten line can be efficiently changed to a straight line without operating the menu button during the input of the handwritten line.

The content management unit 205 manages the content generated and edited by the operation processing unit 203. In the following description, for the sake of simplicity, it is assumed that the interactive whiteboard includes only one page (i.e., a single screen).

The handwriting conversion processing to convert a handwritten line into a straight line candidate is described below in detail. Two methods of handwriting conversion processing after the operator inputs a handwritten line by touch down, drag (also referred to as touch move in the following description), and touch up on the interactive whiteboard are described.

The operations of touch down, drag, and touch up are sequentially input to the operation input unit 202 as operation events. The content generation unit 203b sequentially captures a touch event input to the interactive whiteboard to generate a handwritten line. The touch event is given by way of example as one of the operation events. Subsequently, the content generation unit 203b inputs the generated handwritten line to the content management unit 205. The generated handwritten line is displayed on the touch panel display 1 via the display processing unit 204. In this case, it is assumed that all the coordinate values of the touch events are recorded.

When the operator double-taps a position in the vicinity of the coordinates of the position where a touch up is operated after inputting the handwritten line, the presentation function unit 206 explicitly presents a handwriting conversion candidate menu in which straight line candidates are included. The operator selects a desired straight line candidate from the straight line candidates presented in the handwriting conversion candidate menu. The replacement function unit 208 converts the input handwritten line into the straight line candidate selected by the operator.

Figure 2:
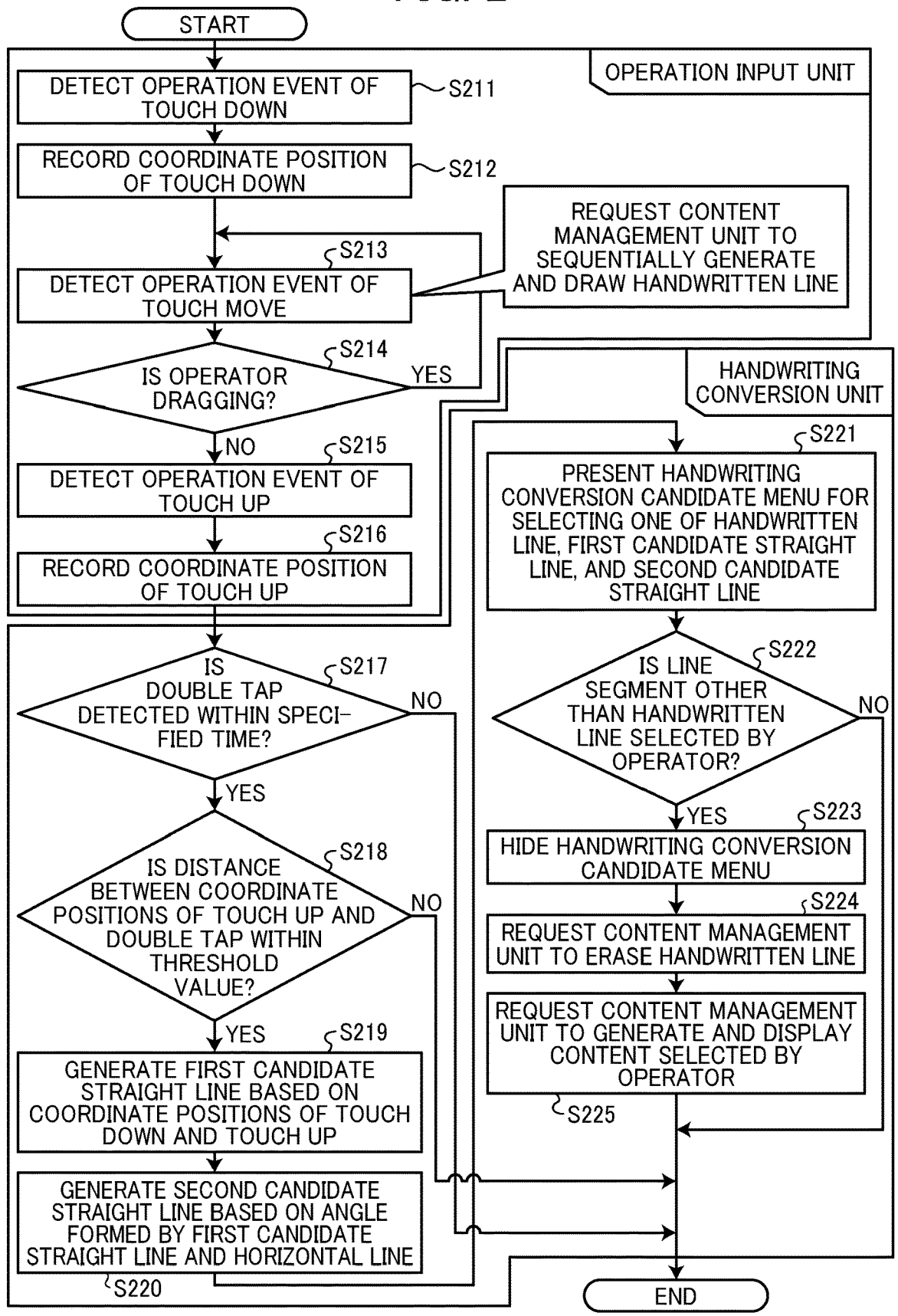
FIG. 2 is a flowchart of the processing to convert a handwritten line drawn on an interactive whiteboard, according to the first embodiment of the present disclosure.

FIG. 2 is a flowchart of the processing to convert a handwritten line drawn on the interactive whiteboard, according to the first embodiment of the present disclosure. The operation input unit 202 detects an operation event of a touch down operated by the operator (step S211). The operation input unit 202 records the coordinates of the position where the touch down is operated by the operator (step S212). The operation input unit 202 detects an operation event of a touch move operated by the operator (step S213). The operation input unit 202 determines whether the operator is in the process of dragging (step S214). In the case where it is determined that the operator is in the process of dragging (YES in step S214), the processing returns to step S213, and the operation input unit 202 continues to detect the operation event of the touch move being operated by the operator.

On the other hand, in the case where it is determined that the operator is not in the process of dragging (NO in step S214), the operation input unit 202 detects an operation event of a touch up operated by the operator (step S215). The operation input unit 202 records the coordinates of the position where the touch up is detected (step S216).

When the input of the handwritten line is completed by the operator operating the touch up and the operation input unit 202 detects the event of the double tap, the determination function unit 207 calculates the elapsed time from the touch up to the double tap and determines whether the calculated elapsed time is within the specified period of time (step S217). In the case where the elapsed time is determined to exceed the specified period of time (NO in step S217), the determination function unit 207 determines that the display of straight line candidates (i.e., conversion candidates) to be converted from the handwritten line is not instructed, and the handwriting conversion processing ends.

In the case where the elapsed time is determined to be within the specified period of time (YES in step S217), the determination function unit 207 determines whether the distance between the coordinates of the position where the touch up is operated and the coordinates of the position where the other touch up (double tap) is operated is within the threshold value (step S218). In the case where the distance is determined to exceed the threshold value (NO in step S218), the determination function unit 207 determines that the display of the conversion candidates is not instructed, and the handwriting conversion processing ends.

In the case where the distance is determined to be within the threshold value and the presentation of the conversion candidates is determined to be instructed (YES in step S218), the presentation function unit 206 calculates (generates) a straight line candidate (the first candidate straight line) based on the coordinates of the position where the touch down is operated and the coordinates of the position where the touch up is operated (step S219). The first candidate straight line may be a straight line having a starting point (x1, y1) at the coordinates of the position where touch down is operated and an ending point (x2, y2) at the coordinates of the position where the touch up is operated. The presentation function unit 206 generates the second candidate straight line based on the angle formed by the first candidate straight line and the horizontal line or the vertical line (step S220).

Figure 3:
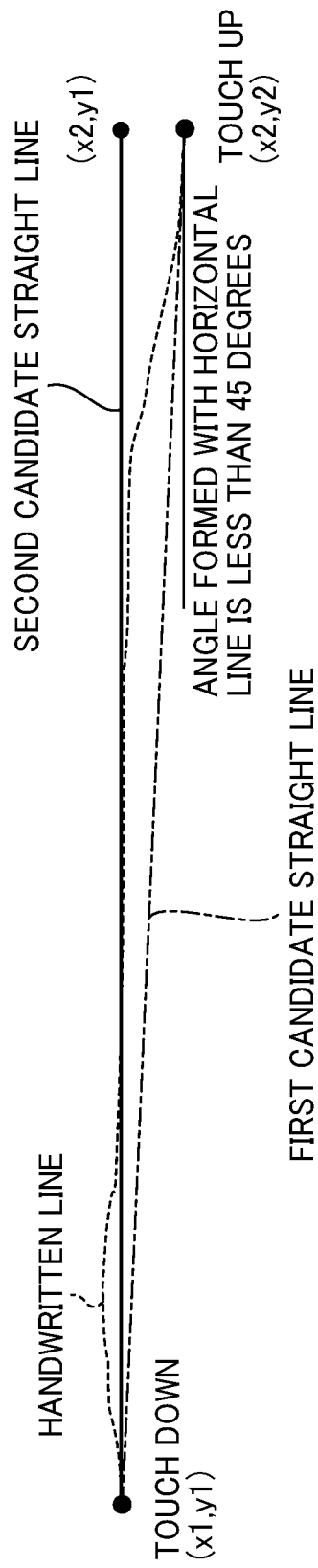
FIG. 3 is a diagram illustrating the processing to generate a straight line candidate on an interactive whiteboard, according to the first embodiment of the present disclosure.
Figure 4:
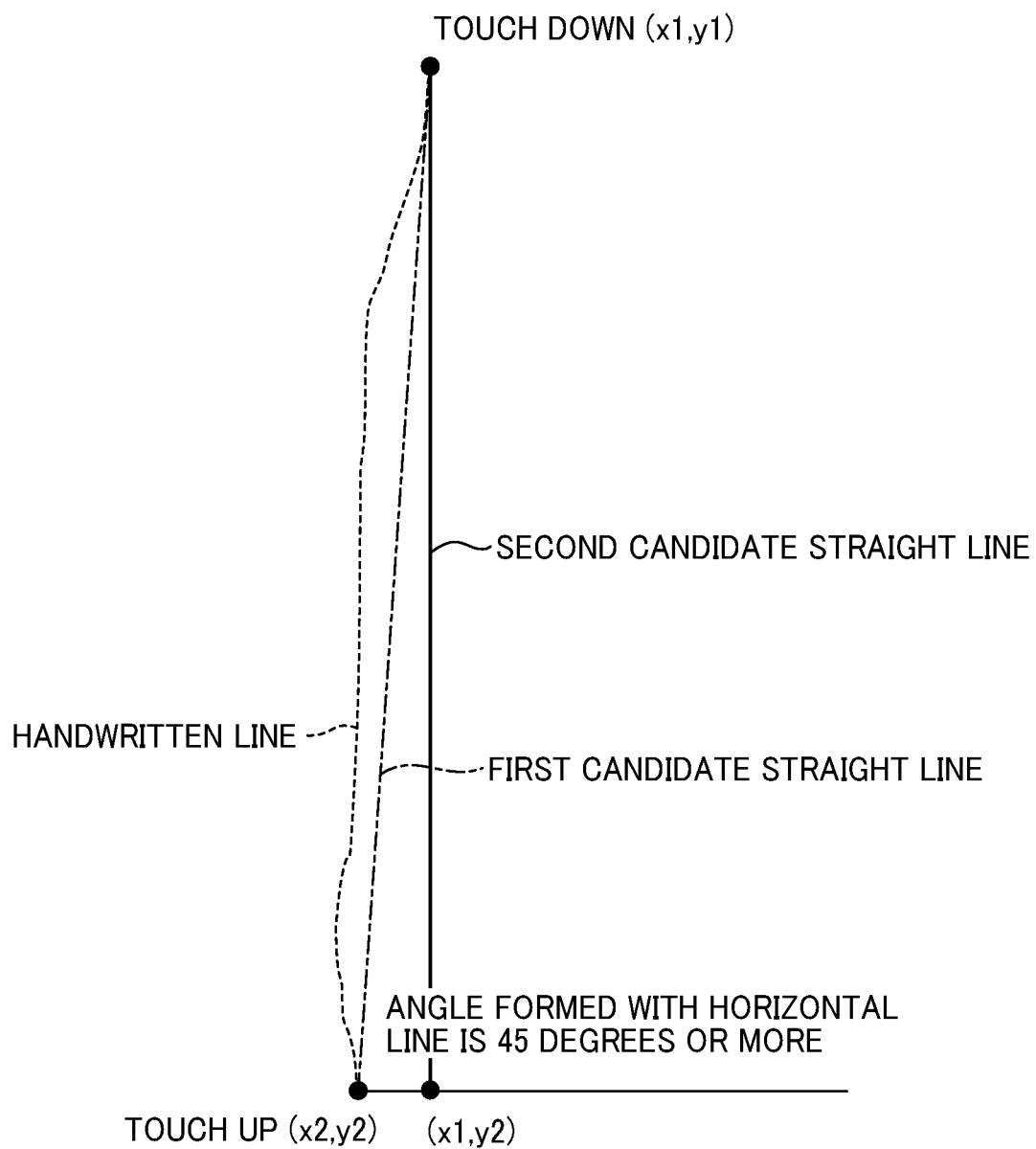
FIG. 4 is a diagram illustrating the other processing to generate a straight line candidate on an interactive whiteboard, according to the first embodiment of the present disclosure.

FIGS. 3 and 4 are diagrams each illustrating the processing to generate a straight line candidate on the interactive whiteboard, according to the first embodiment of the present disclosure. When the angle formed by the first candidate straight line and the horizontal line is less than 45 degrees, the presentation function unit 206 determines that the operator intends to draw a horizontal line, and generates a straight line connecting the point (x1, y1) and another point (x2, y1) as the second candidate straight line as illustrated in FIG. 3. On the other hand, when the angle formed by the first candidate straight line and the horizontal line is 45 degrees or more, the presentation function unit 206 determines that the operator intends to draw a vertical line, and generates a straight line connecting the point (x1, y1) and still another point (x1, y2) as the second candidate straight line as illustrated in FIG. 4.

Referring back to FIG. 2, the presentation function unit 206 presents, to the operator, the handwriting conversion candidate menu for selecting one of the handwritten line, the first candidate straight line, and the second candidate straight line together with each line segment (step S221).

Figure 5:
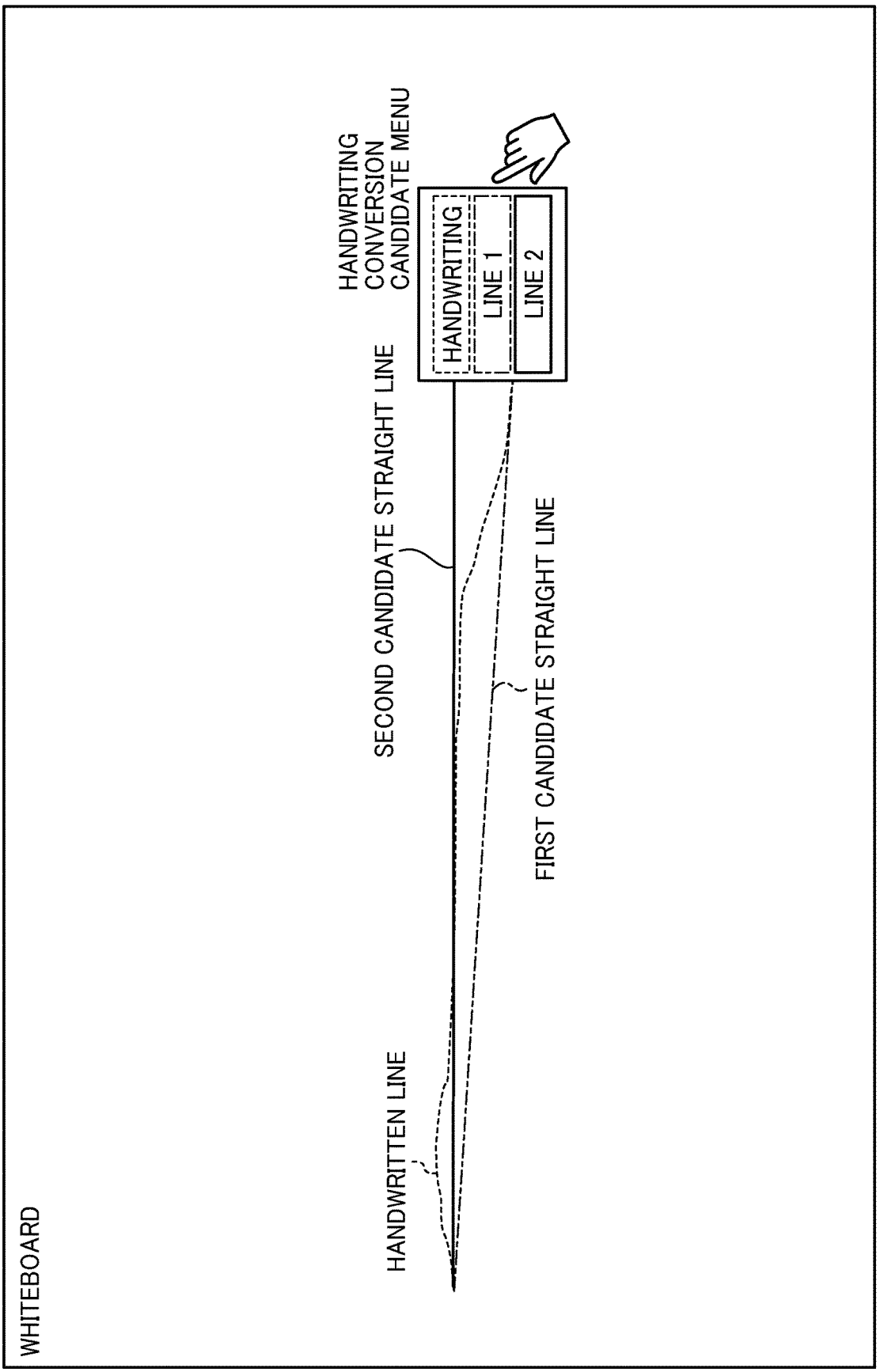
FIG. 5 is a diagram illustrating a menu window displayed on an interactive whiteboard, according to the first embodiment of the present disclosure.

FIG. 5 is a diagram illustrating a menu window displayed on the interactive whiteboard, according to the first embodiment of the present disclosure. In the present embodiment, the presentation function unit 206 arranges a "HANDWRITING" button for selecting the handwritten line, a "LINE 1" button for selecting the first candidate straight line, and a "LINE 2" button for selecting the second candidate straight line in the handwriting conversion candidate menu. The presentation function unit 206 may present each line segment in the handwritten conversion candidate menu so that the operator can compare the line segments for selection.

Referring back to FIG. 2, in the case where the operator presses a button to select a desired line segment other than the handwritten line (for example, the first candidate straight line or the second candidate straight line) (YES in step S222), the presentation function unit 206 hides the handwriting conversion candidate menu (step S223) and finalizes the selected line segment. The presentation function unit 206 requests the content management unit 205 to erase the handwritten line (step S224), and requests the content management unit 205 to generate and display the line segment selected by the operator (step S225).

As described above, according to the interactive whiteboard of the first embodiment, since the operator can select whether to convert the handwritten line into the straight line candidate, the handwritten line can be converted into the straight line candidate as needed. In addition, since the input of the handwritten line can be continued without being disturbed by unnecessary suggestions, the handwritten line can be efficiently changed to a straight line without operating the menu button during the input of the handwritten line. In other words, when a handwritten line is input on the interactive whiteboard, the handwritten line can be converted into a straight line by performing a specific operation under a specific condition.

Second Embodiment

In the present embodiment, after the operator inputs a handwritten line, it is determined whether the operator has drawn a straight line. In the case where it is determined that the operator has drawn a straight line, a case in which the handwriting conversion candidate menu is displayed and a straight line candidate can be selected by the operator as desired is described. In the following description, a description of the same configuration as that of the first embodiment is omitted.

In the present embodiment, the determination function unit 207 determines whether the operator has drawn a straight line after the operator inputs a handwritten line. In other words, in the present embodiment, the condition for determining whether to present straight line candidates is whether or not the operator has drawn a straight line. In the present embodiment, the determination function unit 207 determines whether the operator has drawn a straight line based on a combination of the correlation function of the point sequence included in the handwritten line and the elapsed time from the completion of the input of the handwritten line to the next operation to input. In the case where it is determined that the operator has drawn a straight line, the presentation function unit 206 displays the handwriting conversion candidate menu in which straight line candidates are presented. Thus, only when it is determined that the operator is drawing a straight line by hand, the conversion to one of the straight line candidates is suggested. As a result, the input of the handwritten line can be continued while the handwritten line is being converted into a straight line without any extra operations.

Figure 6:
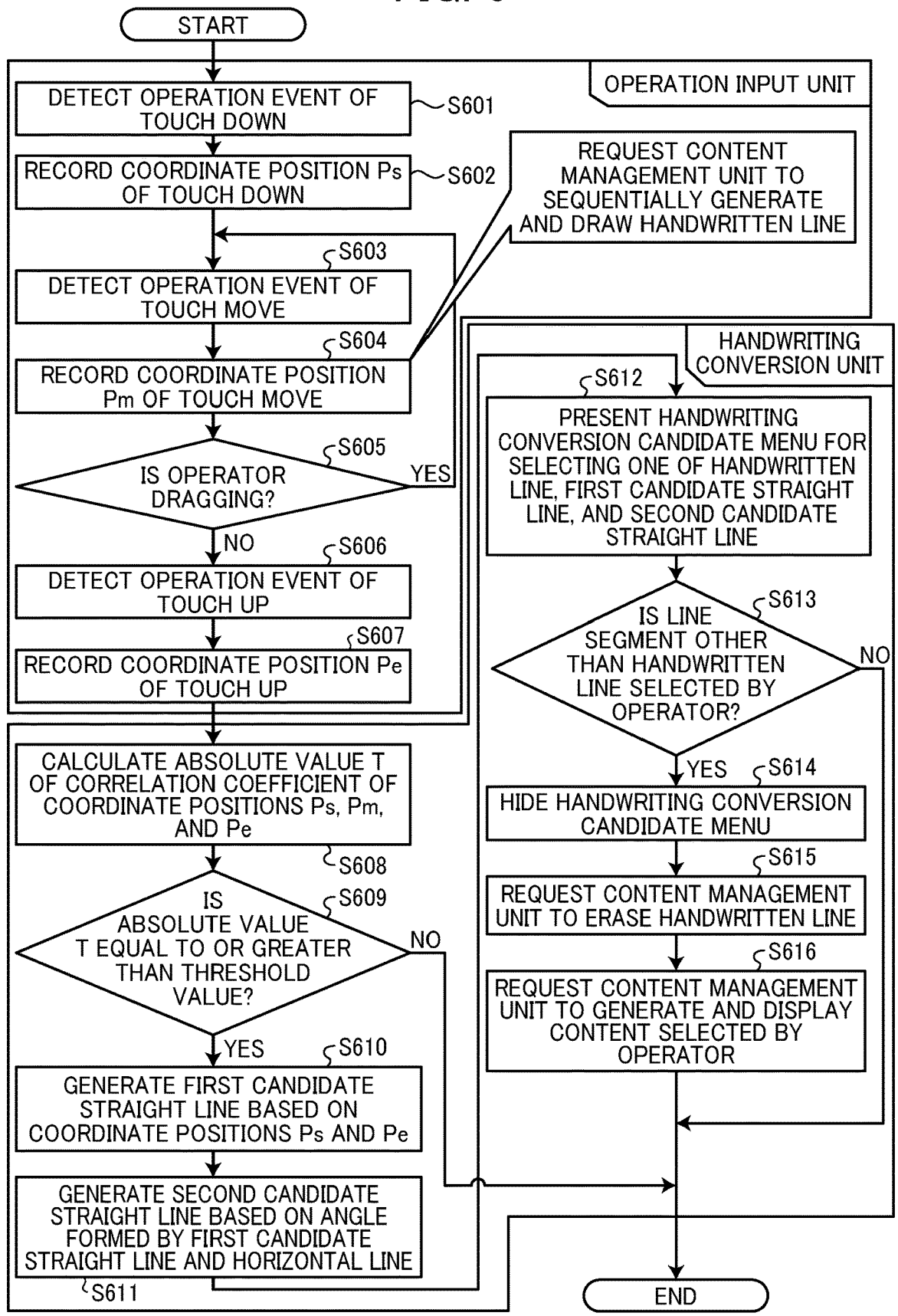
FIG. 6 is a flowchart of the processing to convert a handwritten line drawn on an interactive whiteboard, according to the second embodiment of the present disclosure.

FIG. 6 is a flowchart of the processing to convert a handwritten line drawn on the interactive whiteboard, according to the second embodiment of the present disclosure. The operation input unit 202 detects an operation event of a touch down operated by the operator (step S601). The operation input unit 202 records coordinates Ps of the position where the touch down is operated by the operator (step S602). The operation input unit 202 detects an operation event of a touch move operated by the operator (step S603). The operation input unit 202 records coordinates Pm of the position where the touch move is detected (step S604). The operation input unit 202 determines whether the operator is in the process of dragging (step S605). In the case where it is determined that the operator is in the process of dragging (YES in step S605), the processing returns to step S603, and the operation input unit 202 continues to detect the operation event of the touch move being operated by the operator.

On the other hand, in the case where it is determined that the operator is not in the process of dragging (NO in step S605), the operation input unit 202 detects an operation event of a touch up operated by the operator (step S606). The operation input unit 202 records coordinates Pe of the position where the touch up is detected (step S607).

The determination function unit 207 calculates an absolute value T of the correlation coefficient of the coordinates Ps, Pm, and Pe of the positions as an index for determining whether the handwritten line to be a straight line (step S608). The correlation coefficient is used for determining the linearity of a point sequence. In the present embodiment, the determination function unit 207 uses the absolute value T of the correlation coefficient of the coordinates Ps, Pm, and Pe of the positions that form the handwritten line as an index for determining whether the handwritten line to be a straight line. The correlation coefficient is, for example, an index used for measuring the strength of a linear relationship between two pieces of data or random variables.

In addition to the correlation coefficient, the determination function unit 207 may regularize a change in the distance and direction of the coordinates of the positions included in the handwritten line and use the regularized change as an index for determining whether the handwritten line to be a straight line.

Figure 7:
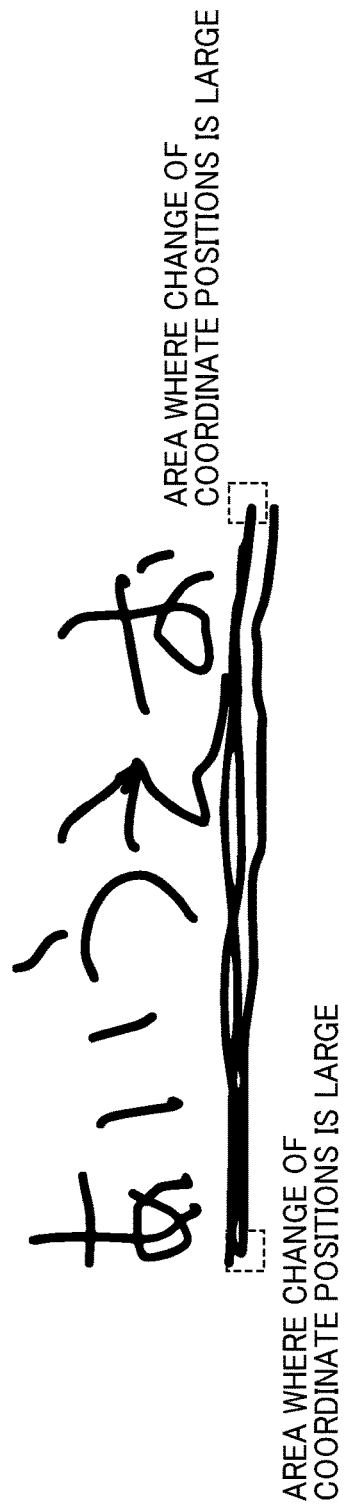
FIG. 7 is a diagram illustrating the processing to convert a handwritten line drawn on an interactive whiteboard, according to the second embodiment of the present disclosure.

FIG. 7 is a diagram illustrating the processing to convert a handwritten line drawn on the interactive whiteboard, according to the second embodiment of the present disclosure. For example, assuming that a vector formed by the coordinates of each position and the coordinates of the next position adjacent to each position is a vector of the coordinates of the positions, an inner product of the vector and the previous vector can be considered a change of the coordinates of the positions. In other words, in the case where the inner product is one, it can be determined that there is no change in the coordinates of target positions. On the other hand, in the case where the inner product is zero, it can be determined that there is a change in the coordinates of the target positions because the coordinates of the target positions shift in opposite directions. By adding such a regulation, as illustrated in FIG. 7, the presentation function unit 206 does not display any straight line candidates to replace the handwritten line in the handwriting conversion candidate menu because the changes of the handwritten lines drawn under a character string in Japanese "あいうえお" (which is pronounced as "a, i, u, e, o") are large in the areas surrounded by the broken lines.

Referring back to FIG. 6, the determination function unit 207 determines whether the absolute value T is equal to or greater than a threshold value (step S609). In the case where the absolute value T is determined to be smaller than the threshold value (NO in step S609), the determination function unit 207 determines that the display of the conversion candidates is not instructed, and the handwriting conversion processing ends. In the case where the absolute value T is determined to be equal to or greater than the threshold value (YES in step S609), the presentation function unit 206 generates the first candidate straight line based on the coordinates Ps of the position and the coordinates Pe of the position (step S610). In addition, the presentation function unit 206 generates the second candidate straight line based on the angle formed by the first candidate straight line and the horizontal line (step S611).

The presentation function unit 206 presents, to the operator, the handwriting conversion candidate menu for selecting one of the handwritten line, the first candidate straight line, and the second candidate straight line together with each line segment (step S612). In the case where the operator presses a button to select a desired line segment other than the handwritten line (YES in step S613), the presentation function unit 206 hides the handwriting conversion candidate menu (step S614) and finalizes the selected line segment.

The presentation function unit 206 requests the content management unit 205 to erase the handwritten line (step S615), and requests the content management unit 205 to generate and display the line segment selected by the operator (step S616).

As described above, according to the interactive whiteboard of the second embodiment, only when it is determined that the operator is drawing a straight line by hand, the conversion to one of the straight line candidates is suggested. As a result, the input of the handwritten line can be continued while the handwritten line is being converted into a straight line without any extra operations.

The program executed by the interactive whiteboard according to the embodiments described above is stored in advance in, for example, a ROM and provided. The program executed by the interactive whiteboard according to the embodiments described above may be configured to be recorded in any computer-readable recording medium, such as a compact disc read-only memory (CD-ROM), a flexible disk (FD), a compact disc-recordable (CD-R), or a digital versatile disc (DVD), in an installable or executable file format and provided as a computer program product.

Alternatively, the program executed by the interactive whiteboard according to the embodiments described above may be stored on a computer connected to a network such as the Internet so that the program can be downloaded through the network and provided. Still, alternatively, the program executed by the interactive whiteboard according to the embodiments described above may be configured to be provided or distributed via a network such as the Internet.

The program executed by the interactive whiteboard according to the embodiments described above has a module structure including at least one of the above-described functional units (such as the video display unit 201, the operation input unit 202, the operation processing unit 203, the display processing unit 204, and the content management unit 205). As actual hardware, a processor such as the CPU reads the program from the above-described ROM and executes the program to load the above-described functional units onto a main storage device and generate the video display unit 201, the operation input unit 202, the operation processing unit 203, the display processing unit 204, and the content management unit 205 on the main storage device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information input apparatus comprising circuitry configured to:
   receive input of a handwritten line from an operator;
   in response to completion of the input of the handwritten line, present one or more straight line candidates inferred based on the handwritten line;
   provide a user interface (UI) that allows the operator to select one of the one or more straight line candidates;
   replace the handwritten line with one of the one or more straight line candidates selected by the operator;
   determine whether to present the one or more straight line candidates after the input of the handwritten line;
   based on a determination that the one or more straight line candidates are to be presented, present the one or more straight line candidates; and
   determine whether to present the one or more straight line candidates based on reception of a double tap after the input of the handwritten line.

2. An information input apparatus, comprising circuitry configured to:
   receive input of a handwritten line from an operator;
   in response to completion of the input of the handwritten line, present one or more straight line candidates inferred based on the handwritten line;
   provide a user interface (UI) that allows the operator to select one of the one or more straight line candidates;
   replace the handwritten line with one of the one or more straight line candidates selected by the operator;
   determine whether to present the one or more straight line candidates after the input of the handwritten line;
   based on a determination that the one or more straight line candidates are to be presented, present the one or more straight line candidates;
   determine whether to present the one or more straight line candidates based on a determination indicating whether or not the operator has drawn the straight line;
   present the one or more straight line candidates based on a result of the determination indicating that the operator has drawn the straight line; and
   determine whether the operator has drawn the straight line based on a combination of a correlation coefficient of a point sequence included in the handwritten line and an elapsed time from the completion of the input of the handwritten line to a next operation of input.

3. A non-transitory recording medium storing a plurality of program codes which, when executed by one or more processors, causes the one or more processors to perform a method, the method comprising:
   receiving input of a handwritten line from an operator;
   in response to completion of the input of the handwritten line, presenting one or more straight line candidates inferred based on the handwritten line;
   providing a user interface (UI) that allows the operator to select one of the one or more straight line candidates;
   replacing the handwritten line with one of the one or more straight line candidates selected by the operator;
   determining whether to present the one or more straight line candidates after the input of the handwritten line;
   based on a determination that the one or more straight line candidates are to be presented, presenting the one or more straight line candidates;

determining whether to present the one or more straight line candidates based on a determination indicating whether or not the operator has drawn the straight line;

presenting the one or more straight line candidates based on a result of the determination indicating that the operator has drawn the straight line; and determining whether the operator has drawn the straight line based on a combination of a correlation coefficient of a point sequence included in the handwritten line and an elapsed time from the completion of the input of the handwritten line to a next operation of input.

* * * * *